Sept. 20, 1938.                H. C. RADELEFF                 2,130,705
                  SAFETY BALL AND SOCKET TRAILER COUPLING
                            Filed Nov. 17, 1936
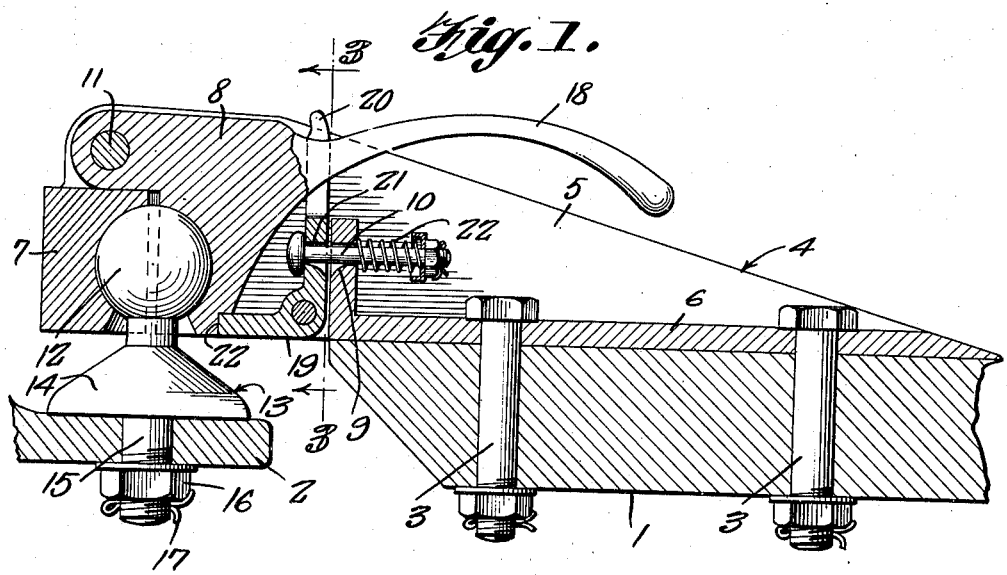
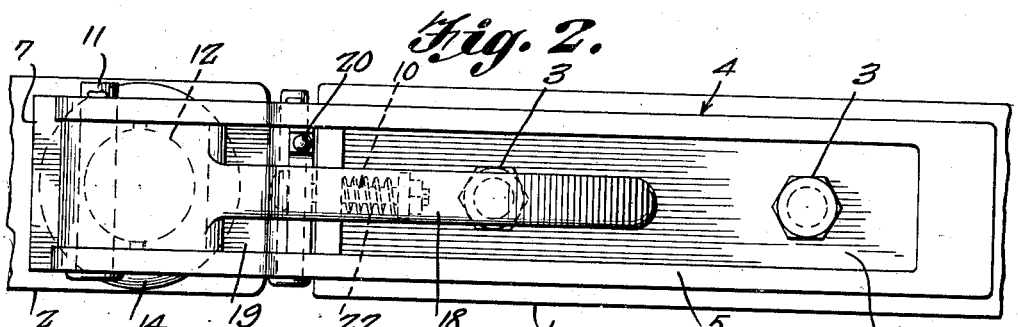
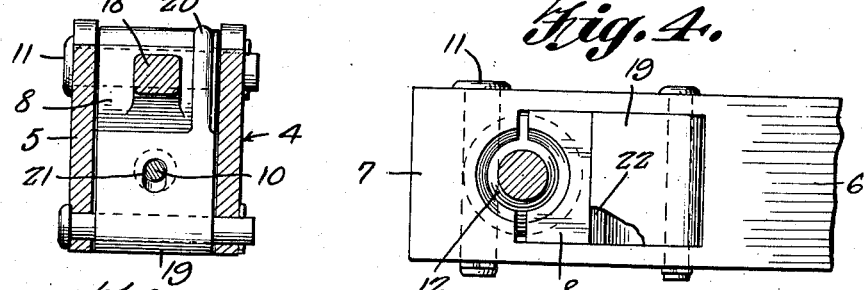
Howard C. Radeleff,
INVENTOR
BY Victor J. Evans & Co.
ATTORNEYS Patented Sept. 20, 1938

2,130,705

UNITED STATES PATENT OFFICE 2,130,705

SAFETY BALL AND SOCKET TRAILER COUPLING

Howard Carl Radeleff, Delano, Calif.

Application November 17, 1936, Serial No. 111,302

1 Claim. (Cl. 280—33.15)

This invention relates to couplers especially adapted for connecting towing vehicles to trailers and similar vehicles and has for the primary object the provision of a simple and inexpensive device of this character which will permit coupling and uncoupling operations to be easily and quickly carried out and will permit the tongue of the trailer to rock upwardly and downwardly on the towing vehicle as well as to swing freely in either direction to the right or left with respect to said towing vehicle.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a coupler constructed in accordance with my invention.

Figure 2 is a top plan view illustrating the same.

Figure 3 is a transverse sectional view taken on the line 3—3 of Figure 1.

Figure 4 is a fragmentary bottom plan view partly in section showing the female portion of the coupler with the male portion therein.

Referring in detail to the drawing, the numeral 1 indicates a tongue of a trailer or other similar vehicle and 2 a bracket attached to a towing vehicle. Secured to the tongue 1 by bolts or similar fasteners 3 is a channeled member 4 consisting of side walls 5 and a connecting bottom wall 6 through which the bolts 3 extend. The female element of the coupler consists of sections 7 and 8. The section 7 forms an integral part of the side walls 5 of the member 4, the bottom or connecting wall 6 of said member terminating short of the section 7 and is bent to extend vertically and provided with an aperture 9 and acts as a keeper for a latch bolt 10. The section 8 of the female part of the coupler is pivoted to the side walls 5 of the member 4, as shown at 11. The sections 7 and 8 have formed therein recesses which cooperate in forming a seat to receive a ball 12 forming an integral part of the male element 13 of the coupler. The male element 13 includes a base 14 resting on the bracket 2 and a reduced screw threaded shank 15 that extends through an aperture in the bracket 2 and has a nut 16 threaded thereon. The nut is held against accidental displacement by a cotter key 17. The nuts on the bolts 3 are also held against accidental displacement by cotter keys. Integral with the section 8 of the female part of the coupler is a lever or handle 18 whereby the section 8 may be manually swung on its pivot.

A latch 19 is pivoted to the side walls 5 of the member 4 and includes a handle 20 apertured, as shown at 21. The latch 19 is adapted to enter a notch 22 formed in the section 8 of the female part of the coupler for the purpose of securing the section 8 against pivotal movement. The latch bolt 10 heretofore referred to is of the headed type and besides extending through the opening 9 also extends through the opening 21. The latch bolt 10 has play between the walls of the openings 9 and 21 and is acted upon by a coil spring 22'. The spring 22' normally acts to urge the latch in a position to engage the notch 22, which however, will yield when force is applied to the lever 20 and thereby permit the latch to disengage the notch 22 and free the section 8 of the female part of the coupler. The section 8 by manual movement of the lever 18 can be swung away from the section 7 to permit the ball 12 to enter or move out of the female part of the coupler. The ball 12 fitting within the seat of the female coupler with the section 8 in a latched position will permit the tongue 1 to rock upwardly and downwardly and also swing sideways in either direction.

Having described the invention, I claim:

A coupler comprising an attaching member securable to a tongue of a trailer, a female part including movable and non-movable sections having the non-movable section integral with said attaching member and the movable section pivoted to said attaching member and fashioned with a handle, said sections having recesses cooperating to form a seat, a male member including a ball received in said seat, a latch including a lever pivoted to said attaching member and engaging said movable section subjacent said seat, and a spring pressed bolt securing said lever to said attaching member and said movable section in locked condition whereby said movable member coacts with said non-movable member to maintain said male member within said seat and said bolt is movable with said lever to release said male member from said seat upon actuation of said latch.

HOWARD CARL RADELEFF.